United States Patent [19]
Marty

[11] Patent Number: 5,601,199
[45] Date of Patent: Feb. 11, 1997

[54] FILTER ELEMENT FOR A BEVERAGE CONTAINER

[76] Inventor: Irene Marty, Hegnauerstr. 2, 8602 Wangen, Switzerland

[21] Appl. No.: 368,997

[22] Filed: Jan. 5, 1995

[30] Foreign Application Priority Data

Jan. 5, 1994 [CH] Switzerland ................................. 24/94
Dec. 13, 1994 [CH] Switzerland ........................... 3765/94

[51] Int. Cl.⁶ .............................. A61J 9/00; A61J 11/04; B65D 23/04; B65D 39/02
[52] U.S. Cl. ...................... 215/11.1; 215/11.4; 215/308; 215/390; 220/371; 220/372
[58] Field of Search ..................... 215/11.1, 11.3, 215/11.4, 11.5, 308, 390; 220/371, 372

[56] References Cited

U.S. PATENT DOCUMENTS

| | | | |
|---|---|---|---|
| 920,791 | 5/1909 | Tonini | 215/308 |
| 1,041,378 | 10/1912 | Tweeddale | 215/11.1 X |
| 2,372,281 | 3/1945 | Jordan | 215/11.1 X |
| 2,438,024 | 3/1948 | Stransky | 215/390 X |
| 2,525,745 | 10/1950 | Wycoff | 215/11.5 |
| 3,143,429 | 8/1964 | Swanson et al. | 215/11.3 X |
| 3,500,831 | 3/1970 | Schaar | 215/11.5 |
| 3,567,060 | 3/1971 | Ballin | 215/11.6 |
| 4,053,648 | 10/1977 | Schmid et al. | 215/11.6 X |
| 4,892,209 | 1/1990 | Dorfman et al. | 215/308 X |
| 5,211,300 | 5/1993 | Hsing et al. | 215/11.4 |

FOREIGN PATENT DOCUMENTS

| | | | |
|---|---|---|---|
| 829530 | 6/1938 | France | 215/11.1 |
| 1189344 | 10/1959 | France | 215/11.1 |
| 57160 | 8/1911 | Switzerland | 215/11.1 |
| 1332175 | 10/1975 | United Kingdom | 215/11.5 |

*Primary Examiner*—Sue A. Weaver
*Attorney, Agent, or Firm*—Tarolli, Sundheim, Covell, Tummino & Szabo

[57] ABSTRACT

A liquid dispenser having a closing member which is provided with an outlet opening for the dispensing of a liquid containing in the dispenser. In order to prevent the outlet opening from being blocked, a disc shaped filter member is provided which comprises a plurality of holes. The individual holes are smaller in diameter than the outlet opening. The filter member can be fixed to the dispenser in the region of its outlet opening by means of the closing member. In order to provide for a simple centering of the filter member on the dispenser, the filter member comprises a tapered circular rib running along its outer edge. Moreover, the filter member is provided with a plurality of notches along its peripheral edge to form a plurality of yielding tongues.

10 Claims, 2 Drawing Sheets

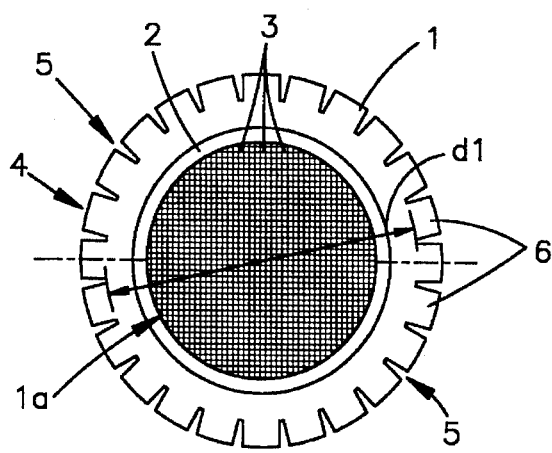
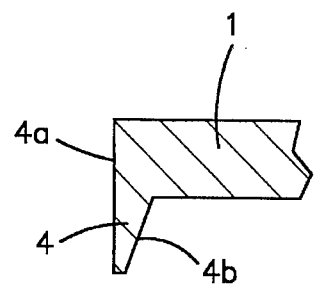
Fig.1
Fig.1a
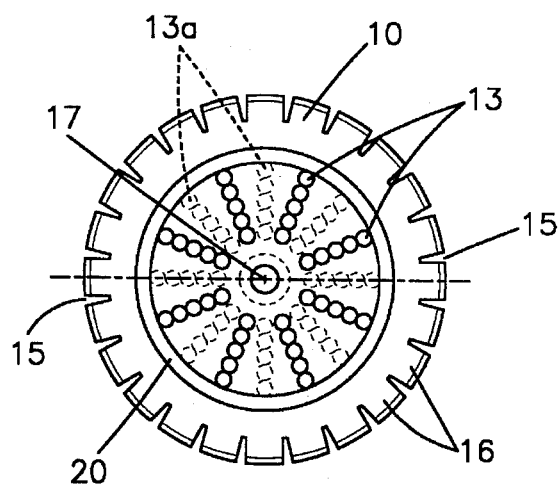
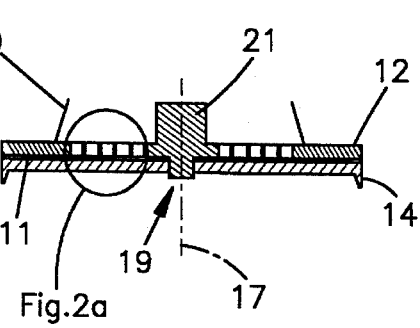
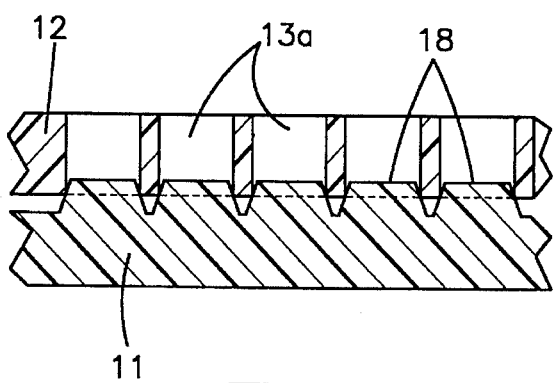
Fig.2
Fig.2a

5,601,199

FILTER ELEMENT FOR A BEVERAGE CONTAINER

Background of the Invention

The present invention refers to a filter element adapted to be used in a container for beverages and to a beverage container provided with a filter element.

Filter elements for beverage containers are particularly useful if the container contains an at least partially inhomogenous liquid and/or a liquid containing solid particles. The problems associated therewith shall be discussed hereinafter in more detail with reference to the example of a nursing bottle.

Usually, nursing bottles are provided with a nipple made of an elastic material, particularly rubber, provided with one or several small holes. The nipple is fixed to the bottle by means of a cap member in the form of a threaded collar. The disadvantage of these known nursing bottles is that the holes in the nipple often become blocked after a short time. The reason is that in many cases the beverage received in the nursing bottle contains inhomogenous components. These components can be, on the one hand, additives of the beverage which are not or not completely solved in the beverage, e.g. milk powder, or, on the other hand, other components added to the beverage, particularly solid particles like vegetable pieces or the like. The blocking of the nipple results in the fact that the baby trying to suck out the beverage contained in the nursing bottle doesn't get anymore supply of the beverage; the baby usually starts to cry. This is particularly uncomfortable if the nurse or mother of the baby sucking on the nursing bottle cannot pay attention to the baby immediately. For instance, if the mother is driving a car while the baby is on the rear seat and sucking its beverage out of the nursing bottle, usually the mother cannot stop the car immediately to help the baby.

It would appear obvious to enlarge the outlet hole or holes provided in the nipple. However, thereby the problem is not solved, but only shifted to another level. By providing a larger hole, the baby would get too much of the beverage per time unit and would thereby choke. Moreover, the very important sucking activity of the baby would be impaired because an enlarged opening in the nipple would allow a beverage contained in the nursing bottle to flow into the mouth of the baby nearly without any resistance. Thereby, the development and reinforcing of the maxillary muscles would be impaired which can lead to consequences appearing only much later in the life of the baby.

OBJECTS OF THE INVENTION

Thus, it is an object of the invention to provide a filter element adapted to be used in a container for beverages, and particularly a nursing bottle provided with a filter element, in which a blocking of the outlet opening by inhomogenous and/or solid particles contained in the beverage is reliably avoided. It is a further object of the invention to provide a filter element adapted to be used in a container for beverages, and particularly a nursing bottle provided with a filter element in which the filter element can be easily cleaned and manufactured.

SUMMARY OF THE INVENTION

To meet these and other objects, the invention provides, according to a first aspect, a filter element adapted to be used in a container for beverages which comprises an outlet opening having an inner diameter and an outer diameter, and closing means removably attached to the container in the region of its outlet opening. The closing means is provided with at least one beverage outlet aperture for the dispensing of beverage.

The filter element comprises a filter member including a substantially disc-shaped filter member body having a top surface and a bottom surface. A plurality of holes is provided in the filter member body whereby each of these holes has a diameter which is smaller than the diameter of the beverage outlet aperture. The filter element can be positioned on the container outlet and fixed thereto.

Preferably, the filter member body is provided with a first annular rib running along the circumferential edge of the filter member body. The annular rib projects from the bottom surface toward the container when the filter element is mounted on the outlet of the container. The rib has an outer surface of cylindrical configuration and an inner surface of conical configuration such that the annular rib is tapered toward its free edge to safely engage the outlet opening of the container.

According to a second aspect, the invention provides a nursing bottle comprising a neck portion with an outlet opening having an inner diameter and an outer diameter, and with an outer thread located adjacent to the outlet opening. Further, a cap member in the manner of a threaded collar with a central opening is provided, adapted to be screwed onto the neck portion of the nursing bottle by engaging the outer thread, and a nipple with a beverage outlet aperture having a certain diameter and inserted into the central opening of the cap member.

A filter element is inserted between the cap member and the outlet opening, comprising a filter member made of polyethylene and including a substantially disc-shaped filter member body having a top surface and a bottom surface and with a plurality of holes provided therein. Each of the holes has a diameter which is smaller than the diameter of the hole in the nipple.

The filter member body is provided with a first annular rib running along the circumferential edge of the filter member body and projecting from the bottom surface to engage the outlet opening of the neck portion. The filter member body is further provided with a plurality of notches located along its circumferential edge and running radially inwards to form a plurality of individual yielding tongue members for resting on the edge of the outlet opening of the neck portion.

BRIEF DESCRIPTION OF THE DRAWINGS

In the following, an embodiment of a nursing bottle and, particularly, of the filter member for a nursing bottle will be further described, with reference to the accompanying drawings, in which:

FIG. 1 shows a top view and a sectional view, respectively, of a first embodiment of a filter member according to the invention;

FIG. 1a shows an enlarged partial sectional view of an edge portion of the filter member according to FIG. 1;

FIG. 2 shows a bottom view and a sectional view, respectively, of a second embodiment of a filter member according to the invention;

FIG. 2a shows an enlarged partial sectional view of a central portion of the filter member according to FIG. 2.

DETAILED DESCRIPTION OF THE PREFERRED EMBODIMENTS

Figure 3:
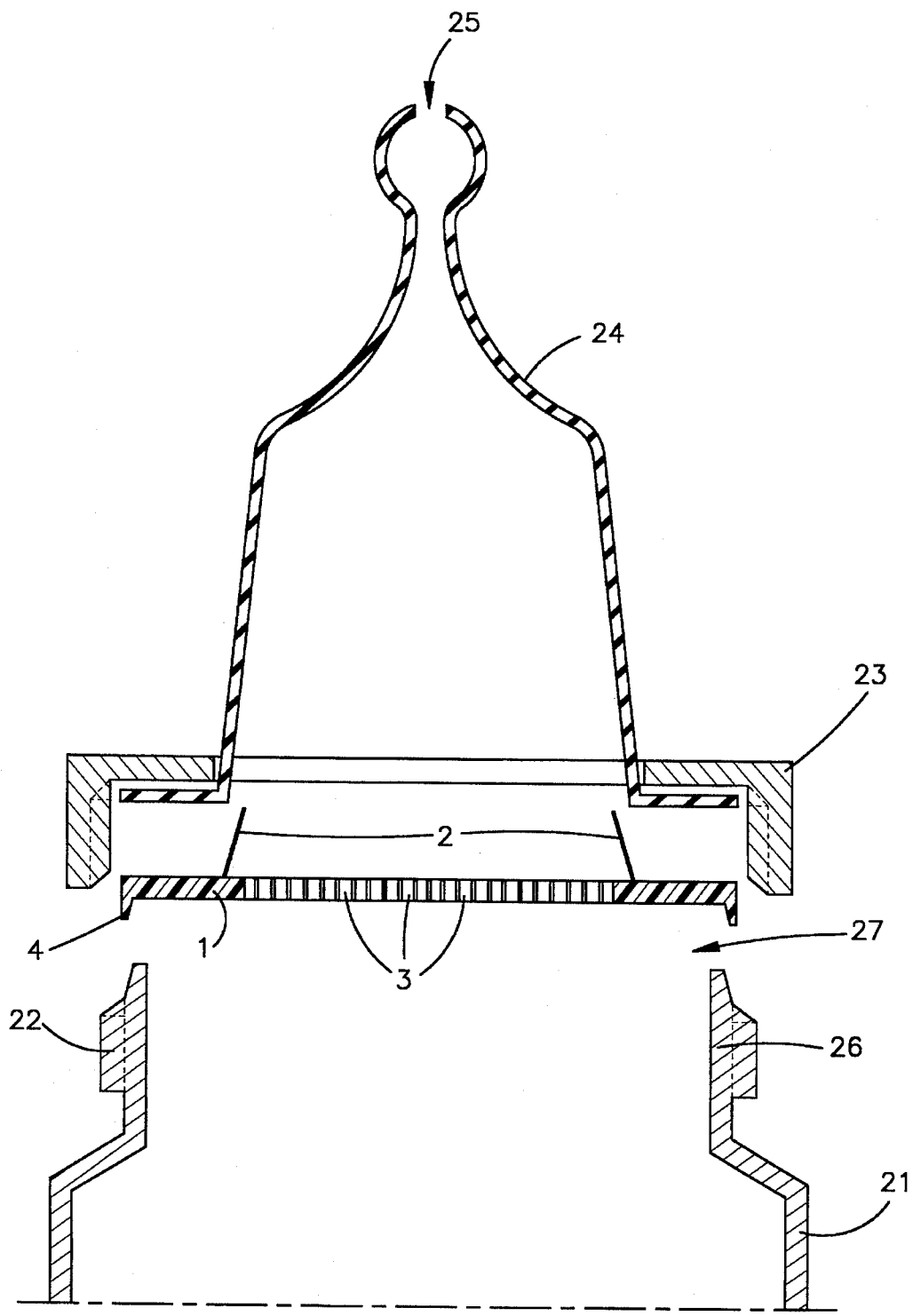
FIG. 3 shows a schematic longitudinal sectional view of a nursing bottle incorporating a filter element according to an embodiment of the invention.

In FIG. 1, there is shown a first embodiment of a filter member 1 designed in accordance with the present invention in a top view and in a cross sectional view, respectively. The filter member body 1 generally has the shape of a disc and is provided with a central sieve portion 1a incorporating a plurality of holes 3 arranged in a grid-like configuration. Along the outer edge of the disc-shaped filter member body 1, there is provided a circular rib 4 projecting downwards from the lower surface of the filter member body 1. While the outer cylindrical surface 4a of the circular rib 4 extends downward perpendicularly from the circumferential edge of the disc-shaped filter member body 1, the inner surface 4b of the circular rib 4 is of cone-shaped configuration such that the cross sectional area of the rib 4 decreases from the lower surface of the filter member body 1 in downward direction. The aforementioned circular rib 4 serves for centering the filter body member 1 with respect to the opening of a bottle, particularly of a nursing bottle 20 (FIG. 3) on which the filter body member 1 is to be mounted.

Moreover, the filter member body 1 is provided with a plurality of notches 5 running in radial direction from the outer edge of the filter member body 1 inwardly. Thus, a plurality of individual yielding tongues 6 are formed. The radial length of the notches 5 is chosen such that the distance $d_1$ between the inner ends of two radially opposite notches 5 is greater than the inner diameter $d_2$ of the neck portion of the bottle on which the filter member body 1 is to be mounted. Thereby, it is prevented that any liquid contained in the bottle can penetrate the space between two adjacent tongues 6, i.e. the notches 5, and escape from the bottle when it is in use.

The top of the filter member body 1 can be provided, as shown in FIG. 1, with an upwardly projecting circular rib 2 located in the region of the edge of the central sieve portion 1a. The design and purpose of this circular rib 2 will be further explained herein after.

In FIG. 2, there is shown a second embodiment of a filter member 10 designed in accordance with the present invention in a bottom view and in a cross sectional view, respectively. As can be seen particularly in the cross sectional view of FIG. 2, the filter member 10 comprises a first filter member body 11 and a second filter member body 12. The two filter member bodies 11 and 12 are coaxially arranged and rotatable around a common central axis 17 with respect to each other. Both filter member bodies are generally disc shaped and each one comprises a plurality of holes 13 and 13a, respectively. As can be seen in FIG. 2, the holes 13 and 13a, respectively, are arranged in a central symmetrical configuration, e.g. in a star like configuration as shown in this particular embodiment. However, any other suitable central symmetrical configuration can be realized. The only important point to consider is that there exists a land portion between two adjacent radial rows of holes 13 and 13a, respectively, which is at least as large as the diameter of a hole 13 and 13a, respectively.

The filter member 10 can be changed from an operating position to a sealing position. This is accomplished by rotating the two filter member bodies 11 and 12 with respect to each other. In the operating position, the holes 13 in the filter member body 11 flush with the holes 13a in the filter body 12, while in the sealing position shown in FIG. 2 the holes 13 in the filter member body 11 are angularly offset with respect to the holes 13a in the filter member body 12.

In order to enable the one filter member body to be rotated with respect to the other one, a central pin 19 is provided which is integrally formed to the filter member body 12 and projects therefrom downwardly. The pin 19 serves as a bearing member for the filter member body 11. The filter member body 12 is provided with a central knob 21 to facilitate its rotation with respect to the filter member body 11, the latter one being adapted to be mounted on the opening of a bottle (FIG. 3).

It may be advisable to provided the lower surface of the filter member body 11, i.e. the surface resting on the top edge of the bottle neck portion, with a roughened structure to increase the friction between the filter member body 11 and the bottle. In this way, the filter member 10 being mounted to the e.g. nursing bottle, the adjustment of the filter 10 element from its operating position to its sealing position, i.e. the rotation of the filter member body 12 with respect to the stationary filter member body 11, is further facilitated.

In order to ensure that the holes 13a provided in the filter member body 12 are reliably sealed, and to further provided a certain degree of locking of the filter member body 12 with respect to the filter member body 11 when the filter member 10 is in its sealing position, the filter member body 11 can be provided with protrusions 18 (FIG. 2a) directed against the filter member body 12 and projecting into the interior of the holes 13a provided in the filter member body 12. The protrusions 18 preferably have approximately the same size as the holes 13 and can have, as can be seen in FIG. 2a, slightly conical shape.

In a manner corresponding to the one shown in and described in connection with the embodiment according to FIG. 1, the filter member 10 of FIG. 2 can be provided with a circular rib 14 and with circumferentially arranged notches 15 for the forming of yielding tongues 16. It is understood that the same remarks as made herein above apply also to the embodiment according to FIG. 2.

FIG. 3 shows a schematic longitudinal sectional view of a nursing bottle incorporating a filter element in the form of a filter member 1. It is understood that the filter member 10 could be mounted to the nursing bottle. The bottle has a body portion 21, a neck portion 26 with a smaller diameter than the body portion 21 and an opening 27. The neck portion 26 is provided with an outer thread 22 arranged adjacent to the opening 27. A bottle top means comprises a threaded collar like cap member 23 having a central top aperture adapted to receive a nipple 24 made in the usual manner e.g. of rubber. The nipple 24 is fixed to the neck portion 26 of the bottle by means of the cap member engaging the outer thread 22. The top of the nipple 24 is provided with a hole 25 through which can be sucked off the liquid contained in the bottle.

The filter member 1 can be fixed to the top edge of the neck portion 26 of the bottle by means of the same threaded collar like cap member 23. In order to prevent the outlet hole 25 of the nibble 24 to be blocked, the holes 3 in the sieve portion 1a of the filter member 1 and the holes 13, 13a in the filter member bodies 11, 12, respectively, are smaller than the hole 25 in the nipple 24. Thus, any inhomogenous portions of the liquid in the bottle and/or any solid particles which may be contained in the liquid and which exceed a predetermined dimension and which could block the outlet hole 25 of the nipple 24 are reliably withhold by the filter member 1. Due to the fact that a great number of holes 3 and 13, 13a, respectively, is provided in the filter member body 1 and 11, 12, respectively, it is ensured that normally a sufficient number of holes stays free to enable the liquid contained in the bottle to pass the filter member 1 and 10, respectively, and to reach the outlet hole 25 in the nipple 24.

In the illustration of FIG. 3, it can also be seen that the mean inner diameter of the circular rib 4 approximately corresponds to the outer diameter of the neck portion 26 of the bottle above the outer thread 22. Thereby, due to the conical shape of the inner surface 4b of the annular rib 4, the filter member 1 is centered with respect to the bottle and, upon screwing on the cap member 23, a reliable sealing of the interior of the bottle is ensured.

As already mentioned, the top surface of the filter member body 1 can be provided with an upwardly projecting circular rib 2 located in the region of the edge of the central sieve portion 1a. Even if such a circular rib 2 is shown only in connection with FIGS. 1 and 3, it is understood that the filter element 10 according to FIG. 2 can be provided with a similar circular rib as well.

The outer diameter of the circular rib 2 substantially corresponds to the inner diameter of the nipple 24 in its lower region, i.e. close to the aperture in the top of the cap member 23. Preferably, the outer surface of the circular rib 2 is upwardly tapered. The nipple 24 being fixed to the neck portion 26 of the bottle, this circular rib 2 projects into the interior of the nipple 24 and assists to fix the nipple in its lower portion and to keep it in a stable shape.

The operation of a nursing bottle incorporating a filter member 1 should be self-understanding and does not need any further explanation. In the case of a filter element 10 according to FIG. 2, the filter element 10 is mounted on the bottle in its sealing position once the bottle has been filled. Upon screwing on the cap member 23 with the nipple 24, the content of the bottle can be thoroughly mixed by shacking the bottle and then stored until its use. Then, the cap member 23 with the nipple 24 is temporarily released, the filter element is brought into its operating position and the cap member 23 with the nipple 24 is screwed on again. If the bottle is not completely emptied, it can be reliably sealed by bringing the filter element 10 into its sealing position again and, thereafter, safely stored and/or transported.

It is understood that the shape and/or design and/or arrangement of the holes 3 and 13, 13a, respectively, can be varied within wide limits. The same is true for the number of holes provided in the filter member bodies 1 and 11, 12, respectively. The filter member body can be designed as a sieve or with a plurality of individual holes, or a combination thereof. It is further understood that many variations of the filter element can be realized within the scope of the appended claims, for instance also in connection with other kinds of bottles, liquid containers and the like, and that the embodiments shown in the drawings and described herein above are for the purpose of illustration only.

What is claimed is:

1. A filter element adapted to be used with a container for beverages, the container comprising an outlet opening having an inner diameter and an outer diameter, and closing means removably attached to the container in the region of its outlet opening and incorporating at least one beverage outlet aperture for the dispensing of beverage, each of the at least one beverage outlet aperture having a first diameter, said filter element comprising a filter member including a substantially disc-shaped filter member body having a top surface and a bottom surface and a plurality of holes therethrough, each of said holes having a second diameter, whereby said second diameter is smaller than the first diameter, said filter element comprising means, cooperating with the closing means, for positioning said disc-shaped filter member body on the container outlet and for fixing said disc-shaped filter member body to the container in the region of the container outlet;

said substantially disc-shaped filter member body being provided with a first annular rib running along the circumferential edge of said filter member body, said annular rib projecting from said bottom surface toward said container when said filter element is mounted on the outlet opening of said container, and said rib having an outer surface of cylindrical configuration and an inner surface of conical configuration such that said annular rib is tapered toward its free edge;

said disc-shaped filter member body being further provided with a second annular rib projecting from the top surface of said filter member body towards said closing means and having a smaller diameter than said first annular rib.

2. A filter element adapted to be used with a container for beverages;

the container comprising an outlet opening having an inner diameter, an outer diameter, and a closing means removably attached to the container in the region of its outlet opening and incorporating at least one beverage outlet aperture for the dispensing of beverage, each of the at least one beverage outlet aperture having a first diameter;

said filter element comprising a filter member including a substantially disc-shaped filter member body having a top surface and a bottom surface and a plurality of holes therethrough, each of said holes having a second diameter smaller than said first diameter;

said filter element comprising means, cooperating with the closing means, for positioning said disc-shaped filter member body on the container outlet and for fixing said disc-shaped filter member body to the container in the region of the container outlet;

said substantially disc-shaped filter member body being provided with a first annular rib running along the circumferential edge of said filter member body, said first annular rib projecting from said bottom surface toward said container when said filter element is mounted on the outlet opening of said container, said first annular rib having an outer surface of cylindrical configuration and an inner surface of conical configuration such that said first annular rib is tapered toward its free edge, wherein the mean inner diameter of said first annular rib provided on said disc-shaped filter member body is greater than said outer diameter of said outlet opening.

3. A filter element according to claim 2 in which said substantially disc-shaped filter member body is provided with means including a plurality of notches located along its circumferential edge and running radially inward to form a plurality of individual yielding the tongue members.

4. A filter element according to claim 3 in which the distance between the inner ends of two radially opposite notches is greater than said inner diameter of said outlet opening.

5. A filter element as defined in claim 2 wherein the cross sectional area of said rib decreases from said bottom surface of said filter member in a downward direction.

6. A filter element as defined in claim 2 wherein said filter element is a one-piece member with said first annular rib being integral with said filter member.

7. A filter element adapted to be used with a container for beverages;

the container comprising an outlet opening having an inner diameter and an outer diameter, said container further comprising a closing means removably attached to the container in the region of its outlet opening and incorporating at least one beverage outlet aperture for the dispensing of beverage, each of the at least one beverage outlet aperture having a first diameter;

said filter element comprising a disc-shaped filter member;

said filter element comprising means, cooperating with the closing means, for positioning said disc-shaped filter member on the container outlet and for fixing said disc-shaped filter member to the container in the region of the container outlet;

said filter member comprising a substantially disc-shaped first filter member body and a substantially disc-shaped second filter member body, one of said filter member bodies having a pin member serving as a bearing member, said first and second filter member bodies being coaxially arranged and rotatable with respect to each other around a common central axis, each of said first and second filter member bodies having a plurality of holes therethrough having a second diameter smaller than said first diameter, a first mutual angular position of said first and second filter member bodies defining an operating position in which the holes of said plurality of holes in said first filter member body are coaxially aligned with the holes of said plurality of holes in said second filter member body, and a second angular position of said first and second filter member bodies different from said first angular position defining a sealing position in which the holes of said plurality of holes in said first filter member body are covered by said second filter member body and the holes of said plurality of holes in said second filter member body are covered by said first filter member body;

one of said first and second filter member bodies being provided with a plurality of protrusions directed against the other one of said first and second filter member bodies, said protrusions having a size substantially corresponding to the size of the holes in said other one of said first and second filter member bodies and projecting into the interior of the holes in said other one of said first and second filter member bodies to sealingly block the passage through said filter element when said first and second filter member bodies are in their sealing position.

8. A filter element adapted to be used with a container for beverages, the container comprising an outlet opening having an inner diameter, an outer diameter, and closing means removably attached to the container in the region of its outlet opening and incorporating at least one beverage outlet aperture for the dispensing of beverage, each of the at least one beverage outlet aperture having a first diameter;

said filter element comprising a disc-shaped filter member;

said filter element comprising means, cooperating with the closing means, for positioning said disc-shaped filter member on the container outlet and for fixing said disc-shaped filter member to the container in the region of the container outlet;

said filter member comprising a substantially disc-shaped first filter member body and a substantially disc-shaped second filter member body, one of said filter member bodies having a pin member serving as a bearing member, said first and second filter member bodies being coaxially arranged and rotatable with respect to each other around a common central axis, each of said first and second filter member bodies having a plurality of holes therethrough having a second diameter smaller than said first diameter, a first mutual angular position of said first and second filter member bodies defining an operating position in which the holes of said plurality of holes in said first filter member body are coaxially aligned with the holes of said plurality of holes in said second filter member body, and a second angular position of said first and second filter member bodies different from said first angular position defining a sealing position in which the holes of said plurality of holes in said first filter member body are covered by said second filter member body and the holes of said plurality of holes in said second filter member body are covered by said first filter member body;

said disc-shaped filter member body being provided with a first annular rib running along the circumferential edge of said second filter member body and projecting from a bottom surface of said second filter member body and a second annular rib projecting from a top surface of said first filter member body towards said closing means and having a smaller diameter than said first annular rib.

9. A nursing bottle comprising:

a neck portion with an outlet opening having an inner diameter, an outer diameter, and an outer thread located adjacent to said outlet opening;

a cap member in the manner of a threaded collar with a central opening, adapted to be screwed onto said neck portion of said nursing bottle by engaging said outer thread;

a nipple with a beverage outlet aperture having a first diameter and inserted into said central opening of said cap member;

a filter element, inserted between said cap member and said outlet opening, comprising a filter member made of polyethylene and having a diameter slightly larger than said outer diameter, said filter member also having a top surface and a bottom surface and a plurality of holes therethrough, each of said holes having a second diameter smaller than said first diameter;

said filter member comprising a substantially disc-shaped first filter member body and a substantially disc-shaped second filter member body, said first and second filter member bodies being coaxially arranged and rotatable with respect to each other around a common central axis, said filter member being provided with a first annular rib running along the circumferential edge of said second filter member body and projecting from said bottom surface to engage said outlet opening of said neck portion, and a second annular rib projecting from said top surface of said filter member towards said nipple and having a smaller diameter than said first annular rib;

said second filter member body being further provided with means including a plurality of notches located along its circumferential edge and running radially inward to form a plurality of individual yielding tongue members for resting on the edge of said outlet opening of said neck portion.

10. A nursing bottle comprising:

a neck portion with an outlet opening having an inner diameter, an outer diameter, and an outer thread located adjacent to said outlet opening;

a cap member in the manner of a threaded collar with a central opening, adapted to be screwed onto said neck portion of said nursing bottle by engaging said outer thread;

a nipple with a beverage outlet aperture having a first diameter and inserted into said central opening of said cap member;

a filter element inserted between said cap member and said outlet opening, said filter element comprising a filter member made of polyethylene and having a diameter slightly larger than said outer diameter, said filter member including a substantially disc-shaped first filter member body and a substantially disc-shaped second filter member body, one of said filter member bodies having a pin member serving as a bearing member, said first and second filter member bodies being coaxially arranged and rotatable with respect to each other around a common central axis, each of said first and second filter member bodies having a plurality of holes therethrough having a second diameter smaller than said first diameter, a first mutual angular position of said first and second filter member bodies defining an operating position in which the holes of said plurality of holes in said first filter member body axially coalign with the holes of said plurality of holes in said second filter member body, and a second annular position of said first and second filter member bodies different from said first angular position defining a sealing position in which the holes of said plurality of holes in said first filter member body are covered by said second filter member body and the holes of said plurality of holes in said second filter member body are covered by said first filter member body;

said second filter member body being provided with a first annular rib running along the circumferential edge of said second filter member body and projecting from a bottom surface of said second filter member body to engage said outlet opening of said neck portion;

said first filter member body being provided with a second annular rib projecting from a top surface of said first filter member body towards said nipple and having a smaller diameter than said first annular rib;

said second filter member body being further provided with means including a plurality of notches located along its circumferential edge and running radially inward to form a plurality of individual yielding tongue members for resting on the edge of said outlet opening of said neck portion.

* * * * *